(12) United States Patent
Voyer et al.

(10) Patent No.: US 8,606,291 B2
(45) Date of Patent: Dec. 10, 2013

(54) METHOD AND APPARATUS FOR DETERMINING, IN A WIRELESS CELLULAR TELECOMMUNICATION NETWORK, WHICH DEVICE AMONG A FIRST AND SECOND DEVICES HAS TO MANAGE DATA ASSOCIATED TO A MOBILE TERMINAL

(75) Inventors: Nicolas Voyer, Rennes Cedex (FR);
Akira Okubo, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 1230 days.

(21) Appl. No.: 12/179,965

(22) Filed: Jul. 25, 2008

(65) Prior Publication Data
US 2009/0042575 A1 Feb. 12, 2009

(30) Foreign Application Priority Data
Aug. 6, 2007 (EP) .................................... 07015391

(51) Int. Cl.
*H04W 36/00* (2009.01)
*H04W 24/00* (2009.01)
(52) U.S. Cl.
USPC .................. 455/456.1; 455/436; 455/440
(58) Field of Classification Search
USPC ................ 455/456.1–456.6, 432.1–432.3, 455/435.1–435.3, 436–444; 370/331, 328
See application file for complete search history.

(56) References Cited

U.S. PATENT DOCUMENTS

| | | | |
|---|---|---|---|
| 6,397,065 B1 * | 5/2002 | Huusko et al. ............. | 455/435.2 |
| 7,142,858 B2 * | 11/2006 | Aoki et al. ................. | 455/436 |
| 7,194,266 B2 * | 3/2007 | Ishikawa et al. ............. | 455/442 |
| 7,697,479 B2 * | 4/2010 | Metke et al. ................. | 370/331 |
| 2007/0213060 A1 * | 9/2007 | Shaheen ..................... | 455/436 |
| 2010/0323697 A1 * | 12/2010 | Miklos et al. ................ | 455/436 |

FOREIGN PATENT DOCUMENTS

WO    WO 99/57935    11/1999

OTHER PUBLICATIONS

"Idle Mobility and Tracking Area Concept in SAE/LTE", Ericsson, 3GPP TSG-RAN WG3 Meeting #50, R3-060049, XP-002466404, Jan. 10-12, 2006, 6 pages.

(Continued)

*Primary Examiner* — Wesley Kim
*Assistant Examiner* — Nam Huynh
(74) *Attorney, Agent, or Firm* — Oblon, Spivak, McClelland, Maier & Neustadt, L.L.P.

(57) ABSTRACT

The present invention concerns a method for determining in a wireless cellular telecommunication network which device among a first device managing data associated to mobile terminals located in a first pool of cells and a second device managing data associated to mobile terminals located in a second pool of cells has to manage data associated to a mobile terminal. The first and second pools of cells have common cells and the mobile terminal is located in the first pool of cells. The first device managing data associated to the mobile terminal:
 receives a first message, from the mobile terminal located comprising a first list of at least one group of cells the mobile terminal moved through,
 determines if the cell in which the mobile terminal is located belongs to the second pool of cells,
 determines if the mobile terminal is going to leave the first pool of cells and/or will not leave the second pool of cells, from the first list and from the cell in which the mobile terminal is located,
 transfers a second message to the second device requesting the second device to manage data associated to the mobile terminal.

15 Claims, 4 Drawing Sheets

(56) References Cited

OTHER PUBLICATIONS

"Reported List of Last Visited Tracking Areas", Mitsubishi Electric, 3GPP TSG RAN WG3 Meeting #56, R3-070782, XP-002466405, May 7-11, 2007, 4 pages.

"Collecting mobility statistics in support of configuration and optimisation of LTE/SAE networks", Mitsubishi Electric, 3GPP TSG RAN WG3 Meeting #55bis, R3-070660, XP-002466406, Mar. 27-30, 2007, 3 pages.

"Tracking Area Concept", Mitsubishi Electric, 3GPP TSG RAN WG3 Meeting #54, R3-061732, XP-002466407, Nov. 6-10, 2006, 3 pages.

* cited by examiner

METHOD AND APPARATUS FOR DETERMINING, IN A WIRELESS CELLULAR TELECOMMUNICATION NETWORK, WHICH DEVICE AMONG A FIRST AND SECOND DEVICES HAS TO MANAGE DATA ASSOCIATED TO A MOBILE TERMINAL

The present invention relates to a method and an apparatus for determining, in a wireless cellular telecommunication network, which device among a first device managing data associated to mobile terminals located in a first pool of cells and a second device managing data associated to mobile terminals located in a second pool of cells has to manage data associated to a mobile terminal.

A wireless cellular telecommunication network, like a mobile telecommunication network, that provides telecommunication services to mobile terminals wandering inside of an area composed of multiple cells of the base stations of the wireless telecommunication network, typically offers means to the mobile telecommunication operator to determine any time which base station is serving the mobile terminal in order to enable a communication session establishment with the mobile terminal.

In order to enable the wireless operator to reach the mobile terminal, a centralizing equipment commands the broadcast of a paging indication in each cell of the base stations of a location area in order to know, from the response of the mobile terminal to the paging indication, which base station is managing the mobile terminal. Such broadcast consumes a non negligible part of the resources of the wireless telecommunication network.

Typically, the location area needs to be large enough in order to enable the location of the mobile terminal with a certain probability of success and needs, on the opposite side, to have a reduced size in order to save the resources of the wireless telecommunication network.

The definition of a location area is a difficult problem and is many times not satisfactory determined. A location area is as example determined according to radio planning techniques and is set for a long period of time. Such location area is not adapted to each mobile terminal which is located in that location area.

In Long Term Evolution, System Architecture Evolution LTE/SAE under discussion in the Third Generation Partnership Project 3GPP, mobile terminals in idle mode roam across various tracking areas, according to the concept of virtual location area (VLA). A tracking area is a group of cells managed by plural base stations. A virtual location area is named also a location area. A list of tracking areas, which compose the virtual location area, is assigned to each mobile terminal and each mobile terminal performs a tracking area update (TAU) request only when it no longer sees any cell belonging to any tracking area identified in the list of tracking areas.

When a tracking area update request occurs, a mobility management entity is in charge of determining a new list of tracking areas that should be assigned to the mobile terminal. A mobility management entity (MME) is a device which manages data associated to mobile terminals located in a pool of cells.

The data associated to each mobile terminal comprises at least the virtual location area assigned to the mobile terminal. The data associated to each mobile terminal comprises also the S-TMSI assigned to the mobile terminal. S-TMSI stands for SAE Temporary Mobile Subscriber Identity. The data associated to each mobile terminal may comprise also the access rights of the mobile terminal, the authentication keys used for authenticating the mobile terminal, the encryption keys, the policy for delivering Quality of Service to the mobile terminal, the address of a user plane entity in charge of delivery of data to the mobile terminal, etc.

Then, the mobility management entity will be responsible for routing any incoming calls to each base station controlling a cell belonging to a tracking area identified in the new list of tracking areas, so as to guarantee that the mobile terminal can be reached any time, when it is in idle mode.

The mobility management entity, managing the data associated to the mobile terminal has the necessary information enabling the mobile terminal to establish a communication with a remote telecommunication device through any base station the mobility management entity is linked through.

Actually, for redundancy/scalability issues, in a given area, a mobile terminal could be treated by one out of many mobility management entities, which are grouped in a pool of mobility management entities.

A pool of cells is defined as a pool of cells of base stations which all have a connectivity relation to each mobility management entity of the pool of management entities.

Each list of tracking areas, associated to a mobile terminal, comprises the identifiers of tracking areas which belong to the same pool of cells.

When a mobile terminal moves from one pool of cells to another pool of cells, the mobile terminal enters in a tracking area which is not contained in the list of tracking areas assigned to the mobile terminal. The mobile terminal has then to transfer a tracking area update request message.

The base station, which receives the message representative of the tracking area update request, can not route the message to the mobility management entity which manages the data associated to the mobile terminal i.e. which manages at least the location of the mobile terminal, and has to select one mobility management entity within the pool of mobility management entity the base station is linked to. Then, a mobility management entity relocation procedure is established between the new and former mobility management entities, involving the transfer of the data associated to the mobile terminal between the mobility management entities, so that the new mobility management entity, can replace the former mobility management entity, in the management of data associated to the mobile terminal like the determination of the location area of the mobile terminal.

Because a mobile terminal can move back and forth across the border of a given tracking area, it is envisaged that pools of cells overlap. Then, it is a matter of implementation to avoid ping-pong relocation procedures by carefully selecting the list of tracking areas that has to be assigned to one mobile terminal when a mobility management entity relocation procedure is performed.

Once a mobile terminal has entered in active mode while being located in the overlapping part of pools of cells, it can then cross the border of the pool of cells of the mobility management entity that is currently managing the mobile terminal. Then, the mobile terminal has to switch back into idle mode, so as to perform a tracking area update procedure which causes a mobility management entity relocation procedure. The time the mobile terminal can enter the active mode again, the communication has been interrupted, causing undesired break of delivered quality of service.

The aim of the invention is therefore to propose a method and a device which make it possible to determine most appropriate device of a wireless cellular telecommunication network which has to manage the data associated to a mobile terminal and to have a location area which is optimized for each mobile terminal of the wireless cellular telecommunication network.

To that end, the present invention concerns a method for determining in a wireless cellular telecommunication network which device among a first device managing data associated to mobile terminals located in a first pool of cells and a second device managing data associated to mobile terminals located in a second pool of cells has to manage data associated to a mobile terminal, the second pool of cells being composed of cells which do not belong to the first pool of cells and of cells which belong to the first pool of cells, the first pool of cells being composed of cells which do not belong to the second pool of cells and of cells which belong to the second pool of cells, the mobile terminal being located in the first pool of cells and the first device managing data associated to the mobile terminal, characterized in that the method comprises the steps, executed by the first device managing data associated to the mobile terminal, of:

receiving a first message, from the mobile terminal located in a cell of the first pool of cells, comprising a first list of at least one group of cells the mobile terminal moved through, determining if the cell, in which the mobile terminal is located, belongs to the second pool of cells, and if the cell, in which the mobile terminal is located, belongs to the second pool of cells:

determining if the mobile terminal is going to leave the first pool of cells and/or will not leave the second pool of cells, from the first list of at least one group of cells the mobile terminal moved through and from the cell in which the mobile terminal is located, transferring a second message to the second device managing data associated to mobile terminals located in the second pool of cells requesting the second device to manage data associated to the mobile terminal if the mobile terminal is going to leave the first pool of cells and/or will not leave the second pool of cells.

The present invention concerns also an apparatus for determining in a wireless cellular telecommunication network which device among a first device managing data associated to mobile terminals located in a first pool of cells and a second device managing data associated to mobile terminals located in a second pool of cells has to manage data associated to a mobile terminal, the second pool of cells being composed of cells which do not belong to the first pool of cells and of cells which belong to the first pool of cells, the first pool of cells being composed of cells which do not belong to the second pool of cells and of cells which belong to the second pool of cells, the mobile terminal being located in the first pool of cells and the first device managing data associated to the mobile terminal, characterized in that the apparatus is included in the first device managing data associated to the mobile terminal, and comprises:

means for receiving a first message, from the mobile terminal located in a cell of the first pool of cells, comprising a first list of at least one group of cells the mobile terminal moved through, means for determining if the cell, in which the mobile terminal is located, belongs to the second pool of cells, means for determining if the mobile terminal is going to leave the first pool of cells and/or will not leave the second pool of cells, from the first list of at least one group of cells the mobile terminal moved through and from the cell in which the mobile terminal is located, if the cell in which the mobile terminal is located belongs to the second pool of cells, means for transferring a second message to the second device managing data associated to mobile terminals located in the second pool of cells requesting the second device to manage data associated to the mobile terminal if the mobile terminal is going to leave the first pool of cells and/or will not leave the second pool of cells.

Thus, it is possible to achieve early relocation of the mobile terminal in the second pool of cells, prior than the mobile terminal leaves the first pool of cells. If the mobile terminal later enters in active mode in the overlapping area and then leaves the first pool of cells, it will not have to perform MME relocation at the time it will leave the first pool of cells. The quality of communication will be preserved.

According to a particular feature, the cells of the first pool of cells are grouped into groups of cells and the cells of the second pool of cells are grouped into groups of cells and the determination if the mobile terminal is going to leave the first pool of cells and/or will not leave the second pool of cells is executed from statistics of transitions of mobile terminals between the group of cells comprising the cell in which the mobile terminal is located and other groups of cells or between the groups of cells comprised in the first list and other groups of cells via the group of cells comprising the cell in which the mobile terminal is located.

Thus, statistics of transitions between groups of cells can be efficiently used to early determine the future likely trajectory of the mobile terminal. It is easy to determine in advance if the mobile terminal is effectively going to leave the first pool of cells and if it is going to stay in the second pool of cells. Accurate likely trajectory information can help triggering efficient early relocation without ping-pong procedures across the two pools of cells.

According to a particular feature, the mobile terminal is going to leave the first pool of cells and/or will not leave the second pool of cells if the statistics of transitions of mobile terminals between the group of cells comprising the cell in which the mobile terminal is located and groups of cells which do not belong to the second pool of cells are low or the statistics of transitions of mobile terminals between the groups of cells comprised in the first list and groups of cells which do not belong to the second pool of cells via the group of cells comprising the cell in which the mobile terminal is located are low.

Thus, statistics of transitions with groups of cells which do not belong to the second pool of cells can be efficiently used to determine the future likely trajectory of the mobile terminal. It is easy to determine if the mobile terminal is effectively going to leave the first pool of cells and if it is going to stay in the second pool of cells. Accurate likely trajectory information can help triggering efficient early relocation without ping-pong procedures across the two pools of cells.

According to a particular feature, the mobile terminal is going to leave the first pool of cells and/or will not leave the second pool of cells if at least one statistic of transitions of mobile terminals between the group of cells comprising the cell in which the mobile terminal is located and another group of cells which does not belong to the first pool of cells is high or at least one statistic of transitions of mobile terminals between one group of cells comprised in the first message and another group of cells which does not belong the first pool of cells via the group of cells comprising the cell in which the mobile terminal is located is high.

Thus, statistics of transitions with groups of cells which do not belong to the first pool of cells can be efficiently used to determine the future likely trajectory of the mobile terminal. It is easy to determine if the mobile terminal is effectively going to leave the first pool of cells and if it is going to stay in the second pool of cells. Accurate likely trajectory information can help triggering efficient early relocation without ping-pong procedures across the two pools of cells.

According to a particular feature, the mobile terminal is going to leave the first pool of cells and/or will not leave the second pool of cells if at least one statistic of transitions of mobile terminals between the group of cells, comprising the cell in which the mobile terminal is located and another group of cells which belongs to the first and second pools of cells and which is neighbour of a group of cells which does not belong to the first pool of cells, is high or at least one statistic of transitions of mobile terminals between one group of cells comprised in the first message and another group of cells which belongs to the first and second pools of cells and which is neighbour of a group of cells which does not belong to the first pool of cells via the group of cells comprising the cell in which the mobile terminal is located is high.

Thus, statistics of transitions a group of cells and another group of cells which belongs to the first and second pools of cells and which is neighbour of a group of cells which does not belong to the first pool of cell, i.e. which are at the edge of the first group of cells, can be efficiently used to determine the future likely trajectory of the mobile terminal. It is easy to determine if the mobile terminal is effectively going to leave the first pool of cells and if it is going to stay in the second pool of cells. Accurate likely trajectory information can help triggering efficient early relocation without ping-pong procedures across the two pools of cells.

According to a particular feature, the mobile terminal is going to leave the first pool of cells and/or will not leave the second pool of cells if the statistics of transitions of mobile terminals between the group of cells comprising the cell in which the mobile terminal is located and other groups of cells which belong to the first and second pools of cells and which are neighbour of a group of cells which do not belong to the second pool of cells are low or if the statistics of transitions of mobile terminals between the groups of cells comprised in the first message and other groups of cells which belong to the first and second pools of cells and which are neighbour of a group of cells which do not belong to the second pool of cells via the group of cells comprising the cell in which the mobile terminal is located are low.

Thus, statistics of transitions with groups of cells which belong to the first and second pools of cells and which are neighbour of a group of cells which do not belong to the second pool of cells, i.e. which are at the edge of the second group of cells, can be efficiently used to determine the future likely trajectory of the mobile terminal. It is easy to determine if the mobile terminal is effectively going to leave the first pool of cells and if it is going to stay in the second pool of cells. Accurate likely trajectory information can help triggering efficient early relocation without ping-pong procedures across the two pools of cells.

According to a particular feature, the second message requesting the second device to manage the data associated to the mobile terminal comprises the first list of at least one group of cells the mobile terminal moved through and information identifying the cell in which the mobile terminal is located or comprises information identifying the cell in which the mobile terminal is located.

Thus, the second device can determine an optimized list of groups of cells associated to the mobile terminal and update the statistics of transition between groups of cells. These statistics are statistics of transitions between groups of cells of the first pool of cells and/or statistics of transitions between groups of cells of the second pool of cells and/or statistics of transitions between groups of cells of the first and second pool of cells.

According to a particular feature, plural second devices manage the location of mobile terminals into the second pool of cells and in that the method comprises further step of selecting one second device among the second devices to which the message requesting the second device to manage the data associated to the mobile terminal is transferred.

Thus, if one second device is overloaded, the first device will select a less loaded second device, and load will be rebalanced among second devices. The malfunction of the second device due to overload is reduced.

According to a particular feature, the first device:
receives a third message from a third device managing data associated to mobile terminals located in a third pool of cells, requesting the first device to manage the data associated to another second mobile terminal, the third message comprising a third list of at least one group of cells the other mobile terminal moved through and/or information identifying the cell in which the other mobile terminal is located,
obtains data associated to the other mobile terminal from at least information comprised in the third message, the data associated to the other mobile terminal being at least a fourth list of groups of cells in which the second mobile terminal is expected to move through,
sends a fourth message comprising the fourth list of group of cells in which the mobile terminal is expected to move through.

Thus, the second mobile terminal can continue its wanderings inside the newly assigned list of groups of cells, i.e. the virtual location area assigned to the second mobile terminal. When an incoming call occurs, paging notifications are routed by the first device to each base station controlling cells in the determined virtual location area, and the mobile terminal will not miss the incoming call. When the mobile terminal leaves the assigned virtual location area, it will notify it to the first device, which can keep track of the location of the mobile terminal.

According to a particular feature, the fourth list of groups of cells is obtained from statistics of transitions of mobile terminals between the group of cells comprising the cell, in which the other mobile terminal is located, and other groups of cells of the first pool of cells or between the groups of cells comprised in the third list and other groups of cells of the first pool of cells via the group of cells comprising the cell in which the mobile terminal is located.

Thus, statistics of transitions with groups of cells can be efficiently used to determine the future likely trajectory of the mobile terminal. It is easy to determine an optimized virtual location area to assign to the mobile terminal, which can be sufficiently small to reduce the efforts related to paging, and large enough with appropriate shaping, to reduce the frequency of tracking area procedures.

According to a particular feature, the third message further comprises the identifier of the base station which controls the cell in which the other mobile terminal is located and in that the fourth message is sent via the base station of which the identifier is comprised in the message.

Thus, the fourth message can be routed to the mobile terminal without impacting the third device. Signaling is reduced.

According to a particular feature, the fourth message is sent via the third device.

Thus, the third device can complete the tracking area procedure normally. The signaling flow from the mobile terminal, the devices and the base stations is unmodified compared with normal tracking area procedure.

According to still another aspect, the present invention concerns a computer program which can be directly loadable into a programmable device, comprising instructions or portions of code for implementing the steps of the method according to the invention, when said computer program is executed on a programmable device.

Since the features and advantages, relating to the computer program, are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 1:
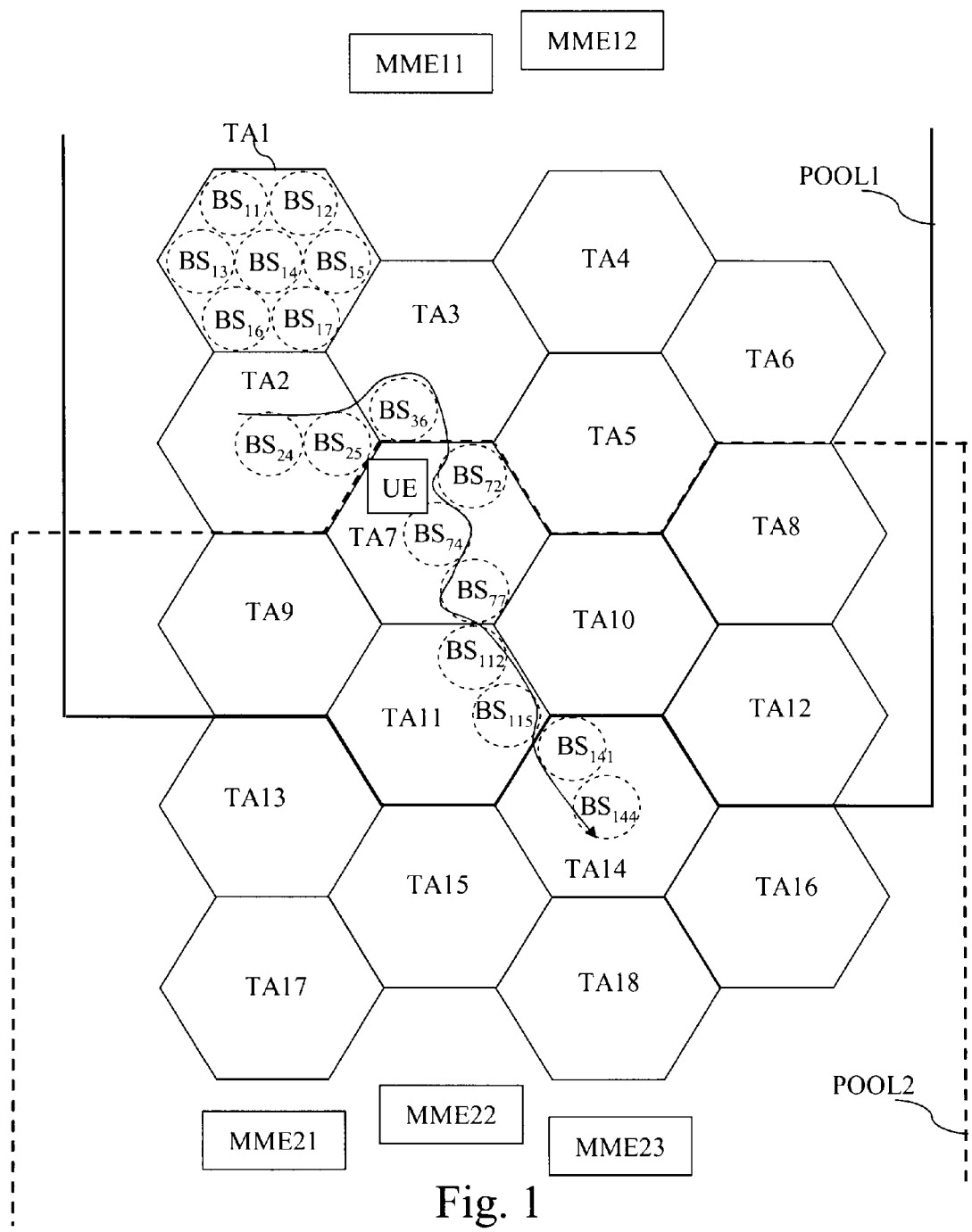
FIG. 1 is a diagram representing the architecture of a wireless cellular telecommunication network, in which the present invention is implemented.

In the FIG. 1, two pools of cells POOL1 and POOL2 are shown.

The pool of cells POOL1 is managed by a pool of first devices composed of first devices MME11 and MME12 managing data associated to mobile terminals located in the pool of cells POOL1. The first devices MME11 and MME12 managing data associated to mobile terminals located in the pool of cells POOL1 will be named hereinafter mobility management entities MME11 and MME12.

The pool of cells POOL2 is managed by a pool of second devices composed of second devices MME21 and MME22 and MME23 managing data associated to mobile terminals located in the pool of cells POOL2. The second devices MME21 and MME22 and MME23 managing data associated to mobile terminals located in the pool of cells POOL2 will be named hereinafter mobility management entities MME21 and MME22 and MME23.

The pool of cells POOL1 comprises the groups of cells TA1 to TA12. The pool of cells POOL2 comprises the groups of cells TA7 to TA18. The groups of cells TA1 to TA18 will be named hereinafter tracking areas TA1 to TA18. The pools of cells POOL1 and POOL2 overlap on the tracking areas TA7 to TA12.

Each tracking area TA is composed of a plurality of cells managed by base stations.

As example, the tracking area TA1 is composed of the group of seven cells represented by circles in doted lines managed respectively by the base stations $BS_{11}$ to $BS_{17}$.

In the FIG. 1, a mobile terminal UE is shown. The mobile terminal UE is located in the cell managed by the base station $BS_{24}$ of the tracking area TA2. The mobility management entity MME11 has previously assigned to the mobile terminal UE the list of tracking areas identifying the tracking areas TA1, TA2 and TA3.

The mobile terminal UE is moving through the cell managed by the base station $BS_{25}$ of the tracking area TA2, the cell managed by the base station $BS_{36}$ of the tracking area TA3, the cells managed by the base stations $BS_{72}$, $BS_{74}$ and $BS_{77}$ of the tracking area TA7, the cells managed by the base stations $BS_{112}$ and $BS_{115}$ of the tracking area TA11 and the cells managed by the base stations $BS_{141}$ and $BS_{144}$ of the tracking area TA14.

When the mobile terminal UE enters in the tracking area TA7, the identifier of the tracking area TA7 is not comprised in the list of tracking areas assigned to the mobile terminal UE.

The mobile terminal UE sends then a tracking area update request message to the mobility management entity MME11 which manages the location of the mobile terminal UE. The mobile terminal UE transfers also the list of the tracking areas TA2 and TA3 it has moved through to the mobility management entity MME11.

The tracking area update request message, comprising the list of visited tracking areas TA2 and TA3, are transferred to the mobility management entity MME11 through the base station $BS_{72}$.

As the mobility management entity MME11 receives the message from the base station $BS_{72}$, the mobility management entity MME11 determines that the mobile terminal UE is located in a tracking area TA, the tracking area TA7, which is comprised in the pools of cells POOL1 and POOL2.

The mobility management entity MME11 predicts, using the list of visited tracking areas TA2 and TA3, that the mobile terminal UE is heading towards the border of the pool of cells POOL1.

The mobility management entity MME11 selects then one mobility management entity MME21, MME22 or MME23 which manages the pool of cells POOL2, and sends a relocation request to that mobility management entity MME, as example the mobility management entity MME21. The mobility management entity MME11 transfers the list of visited tracking areas TA2 and TA3 to the mobility management entity MME21 so that the mobility management entity MME21 can determine the list of tracking areas that should be assigned to the mobile terminal UE.

The new mobility management entity MME21 terminates the tracking area update procedure with the mobile terminal UE, by transferring to the mobile terminal UE through the mobility management entity MME11 or not, the newly determined list of tracking areas.

Each base station BS of the pool of cells POOL1 is linked to each mobility management entity MME11 and MME12 through a telecommunication network not shown in the FIG. 1.

Each base station BS of the pool of cells POOL2 is linked to each mobility management entity MME21, MME22 and MME23 through a telecommunication network not shown in the FIG. 1.

The telecommunication network is, as example and in a non limitative way, a dedicated wired network, a public network like a public switched network, an IP based network, a wireless network, an Asynchronous Transfer Mode network or a combination of above cited networks.

Each mobility management entity MME assigns, for each mobile terminal UE of the wireless cellular telecommunication network it has to manage the location, a virtual location area which is a list of identifiers of tracking areas TA of the wireless cellular telecommunication network. The tracking areas TA of which the identifier is contained in the assigned list of tracking areas transferred to the mobile terminal UE are the tracking areas TA inside which the mobile terminal UE is supposed to be or to move.

When a remote telecommunication device, not shown in the FIG. 1, wants to establish a communication with the mobile terminal UE, the mobility management entity MME11 sends a paging notification message to each base station BS which manages a cell of a tracking area TA of which the identifier is comprised in the list of tracking areas assigned to the mobile terminal UE.

In the FIG. 1, only two pools of cells POOL1 and POOL2 are shown but we can understand that a more important number of pools of cells are used in the present invention.

Figure 2:
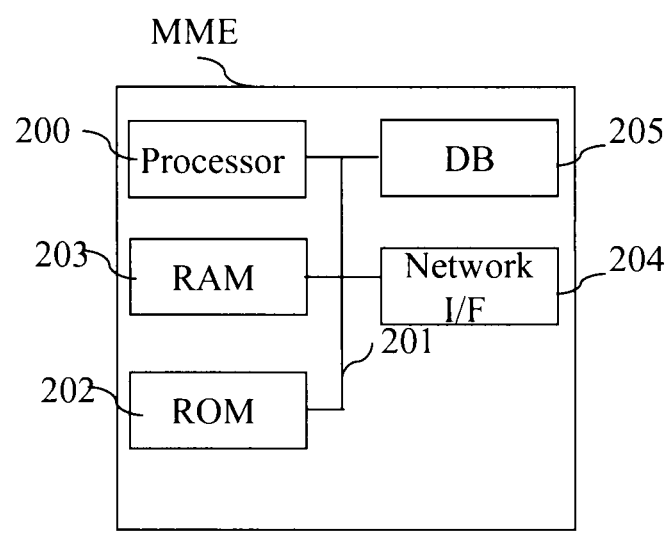
FIG. 2 is a block diagram of a mobility management entity according to the present invention.

FIG. 2 is a block diagram of a mobility management entity according to the present invention.

Figure 3:
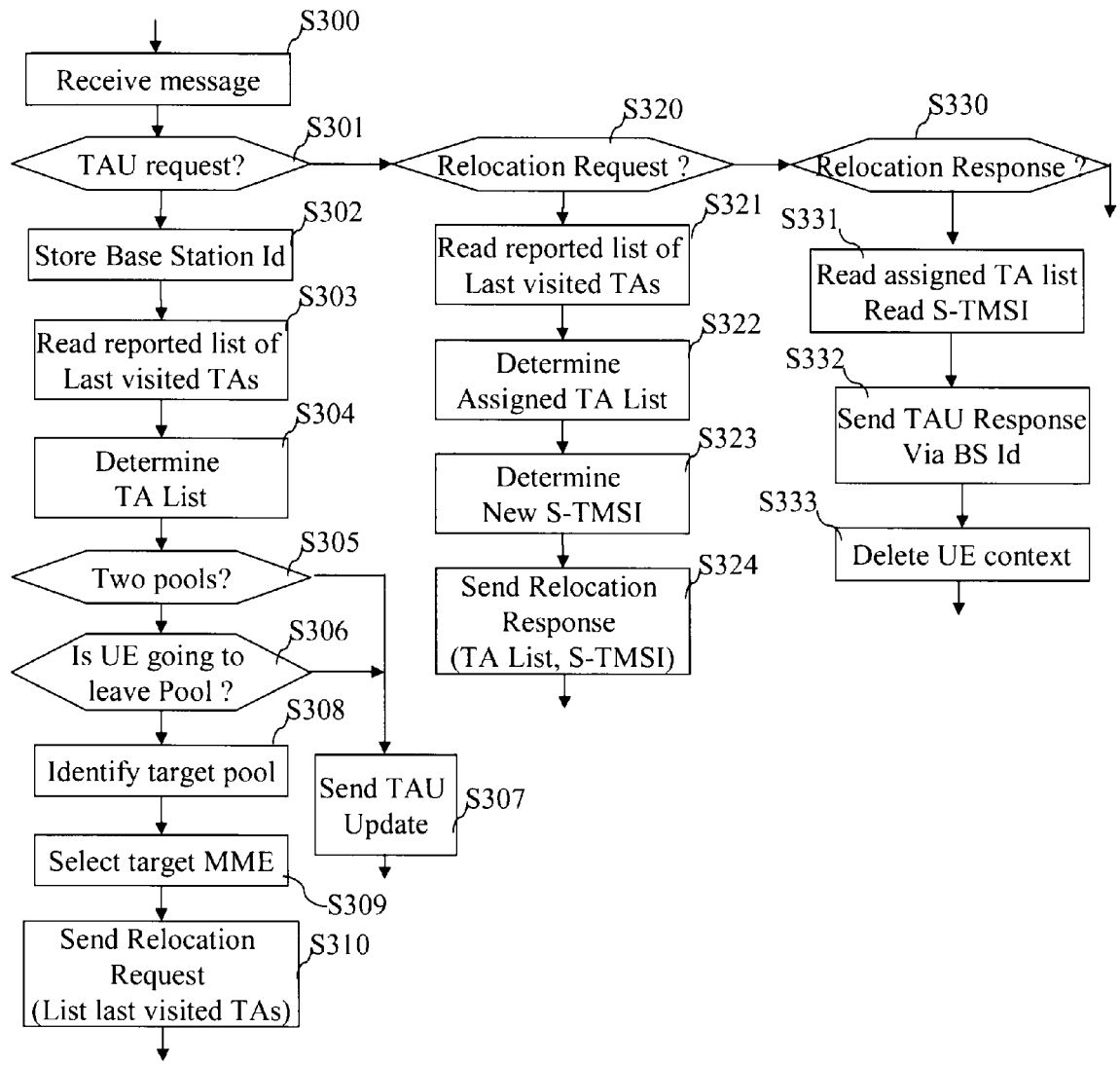
FIG. 3 represents a first algorithm executed by each mobility management entity according to a first mode of realisation of the present invention.
Figure 4:
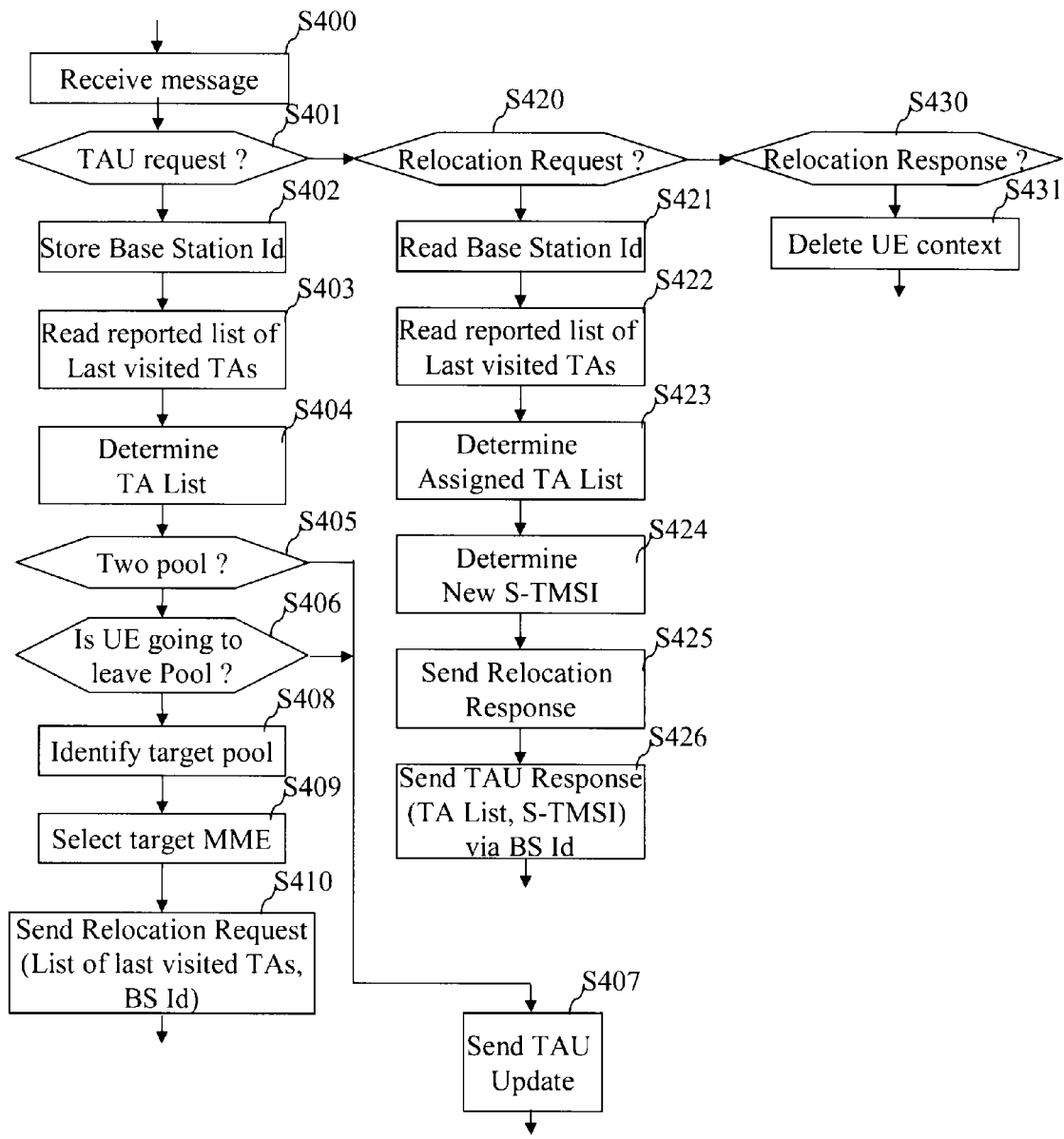
FIG. 4 represents a first algorithm executed by each mobility management entity according to a second mode of realisation of the present invention.

The mobility management entity has, for example, an architecture based on components connected together by a bus 201 and a processor 200 controlled by the programs as disclosed in the FIG. 3 or 4.

The bus 201 links the processor 200 to a read only memory ROM 202, a random access memory RAM 203, a database 205 and a network interface 204.

The memory 203 contains registers intended to receive variables, and the instructions of the programs related to the algorithms as disclosed in the FIG. 3 or 4.

The processor 200 controls the operation of the network interface 204.

The read only memory 202 contains instructions of the programs related to the algorithms as disclosed in the FIG. 3 or 4, which are transferred, when the node 10 is powered on to the random access memory 203.

The mobility management entity MME is connected to the telecommunication network through the network interface 204.

As example, the network interface 204 is a DSL (Digital Subscriber Line) modem, or an ISDN (Integrated Services Digital Network) interface, etc.

The mobility management entity MME comprises a database DB noted 205 which memorizes the number of transitions executed by mobile terminals UE between the tracking areas TA it manages and neighbouring tracking areas TA.

The data base 205 memorizes the statistics of transition between tracking areas TA that the mobility management entity MME calculates. It also memorizes which tracking areas TA belong to the pool of cells of the mobility management entity.

Preferably, the data base 205 stores which tracking areas TA belong to two pools of cells and/or the tracking areas TA which belong to other pools of cells, as example the ones which are neighbour of the pool of cells of the mobility management entity.

The data base 205 memorizes also each list of tracking areas assigned to each mobile terminal UE the mobility management entity MME manages the location.

FIG. 3 represents a first algorithm executed by each mobility management entity according to a first mode of realisation of the present invention.

More precisely, the present algorithm is executed by the processor 200 of each mobility management entity MME.

At step S300, the processor 200 is informed of the reception of a message through the network interface 204.

At next step S301, the processor 200 checks if the received message is a tracking area update (TAU update) request message.

If the message is a tracking area update request message, the processor 200 moves to step S302. Otherwise, the processor 200 moves to step S320. The tracking area update request message is a message transferred by a mobile terminal UE when it enters in a tracking area TA which does not belong to the list of tracking areas, or in other words the virtual location area, which has been assigned by the mobility management entity MME to the mobile terminal UE.

At step S302, the processor 200 memorizes the identifier of the base station BS through which the tracking area update message has been received.

At next step S303, the processor 200 reads the list of tracking areas comprised in the tracking area update request message and memorizes it in the database DB 205. The list of tracking areas comprises at least one identifier of a tracking area TA the mobile terminal UE has moved through.

Preferably, the list of tracking areas comprises the identifiers of the tracking areas TA the mobile terminal UE has moved through since the last tracking area update message previously transferred by the mobile terminal UE.

At step S304, the processor 200 determines a list of tracking areas the mobile terminal UE is susceptible to move through using the identifiers of tracking areas reported by the mobile terminal UE and memorized at step S303.

The list of tracking areas the mobile terminal UE is susceptible to move through is determined from statistics of transitions of mobile terminals between the tracking area TA comprising the cell in which the mobile terminal UE is located and other tracking areas TA and/or between the tracking areas TA identified in the list memorized at step S303 and other tracking areas TA.

As example, the processor 200 selects the tracking areas TA for which the statistics of transition are the highest.

According to a first mode of realisation of the present invention, the statistics of transitions are the probability that the mobile terminal UE moves from the tracking area TA comprising the cell in which the mobile terminal UE is located, i.e. the current tracking area $TA_{curr}$ to a following tracking area $TA_{next}$. Such statistics of transitions are calculated according to the following formula:

$$W_{next} = P_{curr,next} = \frac{M_{curr,next}}{M_{curr}}$$

wherein $M_{curr,next}$ is the number of transitions of mobile terminals between the current tracking area $TA_{curr}$ which comprises the cell in which the mobile terminal UE is located and the tracking area $TA_{next}$, $M_{curr}$ is the number of transitions between the current tracking area $TA_{curr}$ and the tracking areas TA which are neighbour of the current tracking area $TA_{curr}$.

Then, the statistic $P_{curr,next}$ that the mobile terminal UE moves from the current tracking area $TA_{curr}$ to another tracking area $TA_{next}$ is equal to $M_{curr,next}$ normalized by the total number of transitions across different tracking areas TA which have been executed by mobile terminals from the current tracking area $TA_{curr}$ to the tracking areas TA which are neighbour of the current tracking area $TA_{curr}$.

According to a second mode of realisation of the present invention, the statistics of transitions are the probability that the mobile terminal UE moves from a tracking area $TA_{curr}$ identified in the list of tracking areas memorized at step S303, to a following tracking area $TA_{next}$ via the tracking area $TA_{via}$ which comprises the cell in which the mobile terminal UE is located.

Such statistics are calculated according to the following formula:

$$W_{next} = P_{curr,next} + \sigma \sum P_{curr,via} P_{via,next}$$

wherein $$P_{curr,next} = \frac{M_{curr,next}}{M_{curr}},$$

$\sigma$ is a weighting coefficient, $$P_{curr,via} = \frac{M_{curr,via}}{M_{curr}},$$

$$P_{via,next} = \frac{M_{via,next}}{M_{via}},$$

wherein $M_{curr,next}$ is the number of transitions between the tracking area $TA_{curr}$ and the tracking area $TA_{next}$, $M_{curt}$ is the number of transitions between the tracking area $TA_{curr}$ and the tracking areas TA which are neighbour of the n tracking area $TA_{curr}$.

wherein $M_{curr,via}$ is the number of transitions between the tracking area $TA_{curr}$ and the tracking area $TA_{via}$.

$M_{via,next}$ is the number of transitions between the tracking area $TA_{via}$ and the tracking area $TA_{next}$, $M_{via}$ is the number of transitions between the tracking area $TA_{via}$ and the neighbour tracking areas TA of the tracking area $TA_{via}$.

$P_{curr,via}$ is the probability that the mobile terminal UE moves from the tracking area $TA_{curr}$ to the tracking area $TA_{via}$.

$P_{via,next}$ is the probability that the mobile terminal UE moves from the tracking area $TA_{via}$ to the tracking area $TA_{next}$.

The probability $P_{via,next}$ that the mobile terminal UE moves from the tracking area $TA_{via}$ to a following tracking area $TA_{next}$ is equal to $M_{via,next}$ normalized by the total number of transitions between tracking areas TA which have been counted from the tracking area $TA_{via}$ to the tracking areas TA which are neighbour of the tracking area $TA_{via}$.

One skilled man of the art will easily expand the second mode of realisation to plural via tracking areas TA.

It has to be noted here that the formula disclosed in the second mode of realisation of the present invention is also used for determining if the mobile terminal UE will not leave the pool of cells the mobile terminal UE entered.

It has to be noted here that, for the first and second modes of realisation, a transition is the displacement of a mobile terminal UE from a tracking area TA to another tracking area TA.

As the list of tracking areas TA a mobile terminal UE moved through is ordered according to displacement of the mobile terminal UE, transitions are easily obtained by the processor 200. The above mentioned number of transitions are updated with the lists of identifiers of tracking areas TA memorized at step S303 and/or S321.

At next step S305, the processor 200 checks if the identifier of the base station BS through which the tracking area update request message is received corresponds to a base station BS which manages a cell which belongs to at least two pools of cells POOL1 and POOL2.

If the identifier of the base station BS, through which the tracking area update request message is received, corresponds to a base station BS which manages a cell which belongs to at least two pools of cells POOL1 and POOL2, the processor 200 moves to step S306. Otherwise, the processor 200 moves to step S307.

At step S306, the processor 200 checks if the mobile terminal UE is going to leave the pool of cells POOL of the mobility management entity MME and/or will not leave the other pool of cells in which the mobile terminal UE entered.

As example, the mobile terminal UE is going to leave the first pool of cells and/or will not leave the second pool of cells if the statistics of transitions of mobile terminals between the group of cells comprising the cell in which the mobile terminal UE is located and groups of cells which do not belong to the second pool of cells are low or the statistics of transitions of mobile terminals between the groups of cells comprised in the first list and groups of cells which do not belong to the second pool of cells via the group of cells comprising the cell in which the mobile terminal UE is located are low.

In another example, the mobile terminal UE is going to leave the first pool of cells and/or will not leave the second pool of cells if at least one statistic of transitions of mobile terminals between the group of cells comprising the cell, in which the mobile terminal UE is located and another group of cells which do not belong to the first pool of cells, is high or if at least one statistic of transitions of mobile terminals between one group of cells comprised in the first message and another group of cells which do not belong to the first pool of cells via the group of cells comprising the cell in which the mobile terminal UE is located is high.

In another example, the mobile terminal UE is going to leave the first pool of cells and/or will not leave the second pool of cells if at least one statistic of transitions of mobile terminals between the group of cells comprising the cell in which the mobile terminal UE is located and another group of cells which belongs to the first and second pools of cells and which is neighbour of a group of cells which does not belong to the first pool of cell is high or at least one statistic of transitions of mobile terminals between one group of cells comprised in the first message and another group of cells which belongs to the first and second pools of cells and which is neighbour of a group of cells which does not belong to the first pool of cells via the group of cells comprising the cell in which the mobile terminal UE is located is high.

In another example, the mobile terminal UE is going to leave the first pool of cells and/or will not leave the second pool of cells if the statistics of transitions of mobile terminals between the group of cells comprising the cell in which the mobile terminal UE is located and other groups of cells which belong to the first and second pools of cells and which are neighbour of a group of cells which does not belong to the second pool of cells are low or if the statistics of transitions of mobile terminals between the groups of cells comprised in the first message and other groups of cells which belong to the first and second pools of cells and which are neighbour of a group of cells which does not belong to the second pool of cells via the group of cells comprising the cell in which the mobile terminal UE is located are low.

If the mobile terminal UE is leaving the pool of cells POOL of the mobility management entity, the processor 200 moves to step S308. Otherwise, the processor 200 moves to step S307.

At step S307, the processor 200 commands the transfer through the interface 204 of a tracking area update response message to the mobile terminal UE via the base station of which the identifier was memorized at step S302.

The tracking area update response message comprises the S-TMSI and the list of tracking areas assigned to the mobile terminal UE.

The list of tracking areas TA, assigned to the mobile terminal UE, is the list of tracking areas TA the mobile terminal UE is susceptible to move through determined at step S304 which belong to the pool of cells POOL of the mobility management entity MME.

At step S308, the processor 200 determines in which pool of cells POOL is the mobile terminal UE is entering.

If the identifier of the base station BS through which the tracking area update request message is received corresponds to a base station BS which manages a cell which belongs to two pools of cells POOL, the processor 200 determines the pools of cells POOL in which the mobile terminal UE is entering as the other pool of cells POOL to which the base station BS belongs to.

If the identifier of the base station BS through which the tracking area update request message is received corresponds to a base station BS which manages a cell which belongs to more than two pools of cells POOL, the processor 200 determines the pool of cells POOL using the identifiers of tracking areas TA transferred by the mobile terminal UE.

The pool of cells POOL is determined, using the statistics of transitions disclosed at step S304.

As example, the processor 200 selects the pool of cells POOL, for which the sum of probabilities that the mobile terminal UE moves into each tracking area TA of the pool of cells POOL is the highest.

At next step S309, the processor 200 selects one mobility management entity MME which belongs to the pool of mobility management entities MME which manage the determined pool of cells POOL.

The mobility management entity MME is determined preferably according to activity load of the mobility management entities which belong to the pool of mobility management entities which manage the determined pool of cells POOL. The activity load indications are as example received previously by the management entity during other relocation procedures.

At next step S310, the processor 200 commands the transfer of a relocation request message to the determined mobility management entity MME.

The relocation request message comprises the data associated to the mobile terminal UE, the identifier of the base station BS memorized at step S301 and the list of tracking areas TA the mobile terminal UE has transferred in the tracking area update request message received at step S301.

The relocation request message is a message which requests the mobility management entity MME to which the message is sent, to manage the data associated to the mobile terminal UE After that, the processor 200 returns to step S300 and waits for the reception of a new message.

If at step S301, the processor 200 determines that the received message is not a tracking area update (TAU update) request message, the processor 200 moves to step S320.

At step S320, the processor 200 checks if the received message is a relocation request message as disclosed at step S310.

If the message is a relocation request message, the processor 200 moves to step S321. Otherwise, the processor 200 moves to step S330.

At step S321, the processor 200 reads the list of tracking areas reported by the mobile terminal UE and which is comprised in the relocation request message as it has been disclosed in reference to the step S310. The processor 200 memorizes the read list in the database DB 205.

At step S322, the processor 200 determines a list of tracking areas to assign to the mobile terminal UE, i.e. the virtual location area of the mobile terminal UE using the identifiers of tracking areas TA reported by the mobile terminal UE memorized at step S321.

The list of tracking areas to assign to the mobile terminal UE is determined from statistics of transitions as disclosed at step S304 and comprises only tracking areas TA which belong to the pool of cells of the mobility management entity MME.

The list of tracking areas to assign to the mobile terminal UE is determined from statistics of transitions of mobile terminals between the group of cells comprising the cell in which the mobile terminal UE is located and other groups of cells of the pool of cells of the mobility management entity MME or between the groups of cells comprised in the list of tracking areas reported by the mobile terminal UE and other groups of cells of the pool of cells of the mobility management entity MME via the group of cells comprising the cell in which the mobile terminal UE is located.

As example, the processor 200 selects the tracking areas TA for which the probability that the mobile terminal UE moves into the tracking TA is the highest.

At next step S323, the processor 200 determines a new S-TMSI for the mobile terminal UE. The S-TMSI is determined for the mobile terminal UE as far it is managed by the mobility management entity MME.

At next step S324, the processor 200 commands the transfer of a relocation response message to the mobility management entity MME which transferred the relocation request message received at step S320.

The relocation response message comprises the new S-TMSI determined at step S323, the old S-TMSI contained in the message received at step S320 and the list of tracking areas assigned to the mobile terminal UE at step S322.

After that, the processor 200 returns to step S300 and waits for the reception of a new message.

If at step S320, the processor 200 determines that the received message is not a relocation request message, the processor 200 moves to step S330.

At step S330, the processor 200 checks if the received message is a relocation response message as the one previously disclosed at step S324.

If the message is a relocation response message, the processor 200 moves to step S331. Otherwise, the processor 200 returns to step S300 and waits for the reception of a new message.

At step S331, the processor 200 reads the content of the relocation response message, i.e. new S-TMSI, old S-TMSI and the list of tracking areas assigned to the mobile terminal UE.

At next step S332, the processor 200 commands the transfer of a tracking area update response message to the mobile terminal UE via the base station BS of which the identifier was memorized at step S302 for the mobile terminal UE identified by the old S-TMSI indicated in the message received at step S330.

The tracking area update response message comprises the new S-TMSI and the list of tracking areas assigned to the mobile terminal UE received at step S331.

At next step S333, the processor 200 deletes the data associated to the mobile terminal UE from the database 205.

The data associated to each mobile terminal UE comprises at least the virtual location area assigned to the mobile terminal UE. The data associated to each mobile terminal UE comprises also the S-TMSI assigned to the mobile terminal UE. The data associated to each mobile terminal UE may comprise also the access rights of the mobile terminal UE, the authentication keys used for authenticating the mobile terminal UE, the encryption keys, the policy for delivering Quality of Service to the mobile terminal UE, the address of a user plane entity in charge of delivery of data to the mobile terminal UE, etc.

After that, the processor 200 returns to step S300 and waits for the reception of a new message.

FIG. 4 represents a first algorithm executed by each mobility management entity according to a second mode of realisation of the present invention.

More precisely, the present algorithm is executed by the processor 200 of each mobility management entity MME.

The steps S400 to S410 are identical to the steps S300 to S310 of the algorithm of the FIG. 4, they will not be any more described.

Once the step S410 is executed, the processor 200 returns to step S300 and waits for the reception of a new message.

If at step S401, the processor 200 determines that the received message is not a tracking area update (TAU update) request message, the processor 200 moves to step S420.

At step S420, the processor 200 checks if the received message is a relocation request message as disclosed at step S410.

If the message is a relocation request message, the processor 200 moves to step S421. Otherwise, the processor 200 moves to step S430.

At step S421, the processor 200 reads the identifier of the base station BS which is comprised in with the relocation request message.

At next step S422, the processor 200 reads the list of tracking areas transferred in the relocation request message as it has been disclosed in reference to the step S410.

At step S423, the processor 200 determines a list of tracking areas to assign to the mobile terminal UE, i.e. the virtual location area of the mobile terminal UE as it has been disclosed in reference to the step S322.

At next step S424, the processor 200 determines a new S-TMSI for the mobile terminal UE.

At next step S425, the processor 200 commands the transfer of a relocation response message to the mobility management entity which transferred the relocation request message received at step S420.

The relocation response message comprises the old S-TMSI contained in the message received at step S420.

At next step S426, the processor 200 commands the transfer of a tracking area update response message to the mobile terminal UE via the base station of which the identifier was comprised in the relocation request message.

The tracking area response message comprises the new S-TMSI assigned at step S424 and the list of tracking areas assigned to the mobile terminal UE.

After that, the processor 200 returns to step S400 and waits for the reception of a new message.

If at step S420, the processor 200 determines that the received message is not a relocation request message, the processor 200 moves to step S430.

At step S430, the processor 200 checks if the received message is a relocation response message as the one previously disclosed at step S425.

If the message is a relocation response message, the processor 200 moves to step S431. Otherwise, the processor 200 returns to step S300 and waits for the reception of a new message.

At next step S431, the processor 200 deletes the data associated to the mobile terminal UE identified by the old S-TMSI contained in the message received at step S430 from the database 205.

After that, the processor 200 returns to step S400 and waits for the reception of a new message.

Naturally, many modifications can be made to the embodiments of the invention described above without departing from the scope of the present invention.

The invention claimed is:

1. A method for determining in a wireless cellular telecommunication network which device among a first device managing data associated to mobile terminals located in a first pool of cells and a second device managing data associated to mobile terminals located in a second pool of cells has to manage data associated to a mobile terminal, the second pool of cells being composed of cells which do not belong to the first pool of cells and of cells shared by both the first and second pool of cells, the first pool of cells being composed of cells which do not belong to the second pool of cells and of the cells shared by both the first and second pool of cells, the mobile terminal being located in the first pool of cells and the first device managing data associated to the mobile terminal, the method comprising the steps, executed by the first device managing data associated to the mobile terminal, of:
  transferring a first list to the mobile device, the first list specifying at least one group of cells assigned to the mobile terminal;
  receiving a first message from the mobile terminal when the mobile terminal is located in a cell of the first pool of cells not included in the first list, the first message including a second list of at least one group of cells the mobile terminal moved through,
  determining if the cell in which the mobile terminal is located belongs to the second pool of cells,
  and if the cell, in which the mobile terminal is located, belongs to the second pool of cells:
  determining if the mobile terminal is going to leave the first pool of cells and/or will not leave the second pool of cells, from the second list of at least one group of cells the mobile terminal moved through and from the cell in which the mobile terminal is located, and
  transferring a second message to the second device managing data associated to mobile terminals located in the second pool of cells requesting the second device to manage data associated to the mobile terminal if the mobile terminal is going to leave the first pool of cells and/or will not leave the second pool of cells, and
  updating the first list to include the cell in which the mobile terminal is located.

2. The method according to claim 1, wherein the cells of the first pool of cells are grouped into groups of cells and the cells of the second pool of cells are grouped into groups of cells and the determination if the mobile terminal is going to leave the first pool of cells and/or will not leave the second pool of cells is executed from statistics of transitions of mobile terminals between the group of cells comprising the cell in which the mobile terminal is located in and other groups of cells and/or between the groups of cells comprised in the second list and other groups of cells via the group of cells comprising the cell in which the mobile terminal is located.

3. The method according to claim 2, wherein the mobile terminal is going to leave the first pool of cells and/or will not leave the second pool of cells if the statistics of transitions of mobile terminals between the group of cells comprising the cell in which the mobile terminal is located in and groups of cells which do not belong to the second pool of cells are low or the statistics of transitions of mobile terminals between the groups of cells comprised in the second list and groups of cells which do not belong to the second pool of cells via the group of cells comprising the cell in which the mobile terminal is located are low.

4. The method according to claim 2 or 3, wherein the mobile terminal is going to leave the first pool of cells and/or will not leave the second pool of cells if at least one statistic of transitions of mobile terminals between the group of cells comprising the cell in which the mobile terminal is located in and another group of cells which does not belong to the first pool of cells is high or at least one statistic of transitions of mobile terminals between one group of cells comprised in the first message and another group of cells which does not belong to the first pool of cells via the group of cells comprising the cell in which the mobile terminal is located is high.

5. The method according to claim 2, wherein the mobile terminal is going to leave the first pool of cells and/or will not leave the second pool of cells if at least one statistic of transitions of mobile terminals between the group of cells comprising the cell in which the mobile terminal is located in and another group of cells which belongs to the first and second pools of cells and which is neighbour of a group of cells which does not belong to the first pool of cells is high or at least one statistic of transitions of mobile terminals between one group of cells comprised in the first message and another group of cells which belongs to the first and second pools of cells and which is neighbour of a group of cells which does not belong to the first pool of cells via the group of cells comprising the cell in which the mobile terminal is located is high.

6. The method according to claim 2, wherein the mobile terminal is going to leave the first pool of cells and/or will not leave the second pool of cells if the statistics of transitions of mobile terminals between the group of cells comprising the cell in which the mobile terminal is located in and other groups of cells which belong to the first and second pools of cells and which are neighbour of a group of cells which does not belong to the second pool of cells are low or if the statistics of transitions of mobile terminals between the groups of cells comprised in the first message and other groups of cells which belong to the first and second pools of cells and which are neighbour of a group of cells which does not belong to the second pool of cells via the group of cells comprising the cell in which the mobile terminal is located are low.

7. The method according to claim 1, wherein the second message requesting the second device to manage the data associated to the mobile terminal comprises the second list of at least one group of cells the mobile terminal moved through and information identifying the cell in which the mobile terminal is located in or comprises information identifying the cell in which the mobile terminal is located in.

8. The method according to claim 1, wherein plural second devices manage the location of mobile terminals in the second pool of cells and method comprises a further step of selecting one second device among the second devices to which the message requesting the second device to manage data associated to the mobile terminal is transferred.

9. The method according to claim 1, wherein the method comprises further steps of:
receiving a third message from a third device managing data associated to mobile terminals located in a third pool of cells, requesting the first device to manage the data associated to another second mobile terminal, the third message comprising a third list of at least one group of cells the other mobile terminal moved through and/or information identifying the cell in which the other mobile terminal is located in,
obtaining data associated to the other mobile terminal from at least information comprised in the third message, the data associated to the other mobile terminal being at least a fourth list of groups of cells in which the second mobile terminal is expected to move through, and
sending a fourth message comprising the fourth list of group of cells in which the mobile terminal is expected to move through.

10. The method according to claim 9, wherein the fourth list of groups of cells is obtained from statistics of transitions of mobile terminals between the group of cells comprising the cell in which the other mobile terminal is located in and other groups of cells of the first pool of cells or between the groups of cells comprised in the third list and other groups of cells of the first pool of cells via the group of cells comprising the cell in which the mobile terminal is located.

11. The method according to claim 10, wherein the third message further comprises the identifier of the base station which controls the cell in which the other mobile terminal is located and in that the fourth message is sent via the base station of which the identifier is comprised in the message.

12. The method according to claim 10, wherein the fourth message is sent via the third device.

13. The method according to claim 3, wherein the statistics of transitions are updated from each received list of at least one group of cells a mobile terminal moved through.

14. An apparatus for determining in a wireless cellular telecommunication network which device among a first device managing data associated to mobile terminals located in a first pool of cells and a second device managing data associated to mobile terminals located in a second pool of cells has to manage data associated to a mobile terminal, the second pool of cells being composed of cells which do not belong to the first pool of cells and of cells shared by the first and second pool of cells, the first pool of cells being composed of cells which do not belong to the second pool of cells and of the cells shared by the first and second pool of cells, the mobile terminal being located in the first pool of cells and the first device managing data associated to the mobile terminal, the apparatus being included in the first device managing data associated to the mobile terminal, and comprising:
means for transferring a first list to the mobile device, the first list specifying at least one group of cells assigned to the mobile terminal,
means for receiving a first message from the mobile terminal when the mobile terminal is located in a cell of the first pool of cells not included in the first list, the first message including a second list of at least one group of cells the mobile terminal moved through,
means for determining if the cell in which the mobile terminal is located belongs to the second pool of cells,
means for determining if the mobile terminal is going to leave the first pool of cells and/or will not leave the second pool of cells, from the second list of at least one group of cells the mobile terminal moved through and from the cell in which the mobile terminal is located, if the cell in which the mobile terminal is located belongs to the second pool of cells, and
means for transferring a second message to the second device managing data associated to mobile terminals located in the second pool of cells requesting the second device to manage data associated to the mobile terminal if the mobile terminal is going to leave the first pool of cells and/or will not leave the second pool of cells, and
means for updating the first list to include the cell in which the mobile terminal is located.

15. A non-transitory computer-readable storage medium storing a program which, when executed by a computer, causes the computer to perform the method according to claim 1 or 13.

* * * * *